United States Patent Office 3,738,975 Patented June 12, 1973

3,738,975

PROCESS FOR IMPROVING THE THERMAL STABILITY OF POLYVINYL ALCOHOL WITH A CYCLIC POLYCARBOXYLIC ACID

John E. Bristol, Niagara Falls, N.Y., assignor to E. I. du Pont de Nemours and Company, Wilmington, Del.
No Drawing. Filed Mar. 2, 1972, Ser. No. 231,364
Int. Cl. C08f 27/16
U.S. Cl. 260—91.3 PV 6 Claims

ABSTRACT OF THE DISCLOSURE

The thermal stability of polyvinyl alcohol containing an alkali metal acetate is improved by mixing a sufficient amount of a cyclic polycarboxylic acid selected from the group consisting of phthalic acid, terephthalic acid, isophthalic acid, and cis 4-cyclohexene dicarboxylic acid-1,2 with the polyvinyl alcohol to convert the alkali metal acetate contained with the polyvinyl alcohol to acetic acid and an alkali metal salt of the cycylic polycarboxylic acid such that when the composition is made up as a 10% solution in water, the solution has a pH of from about 3.0 to about 3.5.

BACKGROUND OF THE INVENTION

Field of invention

This invention relates to a process for improving the thermal stability of polyvinyl alcohol containing an alkali metal acetate. In particular, it relates to the treatment of such polyvinyl alcohol by the addition of certain cyclic polycarboxylic acids to the polyvinyl alcohol.

Prior art

Polyvinyl alcohol is usually prepared by the alkali metal alcoholate catalyzed alcoholysis of an alcoholic solution of a polyvinyl ester, most usually polyvinyl acetate. This process is accompanied with the formation of an alkali metal acetate when polyvinyl acetate is used, some of which adheres to and is contained in the polyvinyl alcohol. In addition, after the alcoholysis reaction is complete, acetic acid is added to the alcoholysis reaction mixture to neutralize its alkalinity. Neutralization of the alkaline reaction mixture occurs with the formation of an alkali metal acetate, some of which again adheres to the polyvinyl alcohol.

Polyvinyl alcohol having an alkali metal acetate associated with it is subject to discoloration in either powder or film form, when it is heated above 100° C., thus, the polyvinyl alcohol is said to have poor thermal stability. It is thought that the presence of the alkali metal acetate in the polyvinyl alcohol is responsible, in large measure, for the color formation. This poor thermal stability renders polyvinyl alcohol more or less unacceptable for many potential applications which involve heat treatments such as the formation of various films, filaments, coatings, laminates and other related articles.

Moreover, when polyvinyl alcohol having an alkali metal acetate associated with it is cast in various film forms, the film, with the passage of time, develops a bloom or haze, in addition to any discoloration which may develop. This bloom or haze is thought to be the result of migration of the alkali metal acetate te the surface of the polyvinyl alcohol film.

Another important use of polyvinyl alcohol is as a textile size. It has been found that, in addition to the undesired color formation, polyvinyl alcohol having an alkali metal acetate associated with it tends to become water insoluble when heated over 100° C. If the textile material sized with polyvinyl alcohol is to be subjected to the heat treatments involved in many permanent press processes, it is, of course, important that the polyvinyl alcohol be free of adhering alkali metal acetate to prevent undesired color formation (thermal instability) and to insure that the polyvinyl alcohol remains water soluble so that the textile material can be easily desized prior to dyeing.

Various attempts have been made to overcome the problem of thermal instability of polyvinyl alochol. For example, U.S. Pat. No. 3,220,991 describes a process in which an alcohol-soluble aliphatic polycarboxylic acid, such as itaconic acid, adipic acid, malic acid, and tartaric acid, is added directly to a solution of an alkaline (sodium hydroxide) alcoholyzed polyvinyl ester immediately after the alcoholysis reaction is complete to neutralize the alkaline catalyst. This process, however, requires multiple washings (at least five) of the neutralized polyvinyl alcohol with either methanol or ethanol to remove not only excess neutralization acid, but also other salt by-products of the alcoholysis reaction. These washings make the process costly in terms of production time and cost of the alcohol used in the wash.

U.S. Pat. No. 3,156,667 describes a process for improving the thermal stability of polyvinyl alcohol by treating the polyvinyl alcohol with phosphoric acid. However, this process also requires repeated washings of the polyvinyl alcohol with alcohol to remove excess acid and by-product salts. U.S. Pat. 2,785,146 discloses a method for improving the thermal stability of polyvinyl alcohol by adding salts such as zinc sulfate, aluminum sulfate, potassium aluminum sulfate and sodium aluminum sulfate to the polyvinyl alcohol.

These patents teach, in agreement with the statements made above, that the most probable cause of the thermal stability of polyvinyl alcohol can be traced to alkaline reacting salts such as sodium acetate, which are present in the polyvinyl alcohol.

Although not related to the problem of thermal stability, U.S. Pat. No. 2,169,250 should be mentioned here. Polyvinyl alcohol is normally water soluble. Pat. No. 2,169,250 describes a method for forming films, threads, and the like from polyvinyl alcohol which will be insoluble in water and all common solvents. According to the patent, this is accomplished by forming an aqueous solution of polyvinyl alcohol and a compound capable of forming a crosslinked structure with the polyvinyl alcohol such as phthalic acid, terephthalic acid, polymerized acrylic acid and polymerized methacrylic acid; forming the solution into a film or thread; and heating the thus-formed structure to a temperature sufficient to cause the polyvinyl alcohol to react with the acid forming a cross-linked structure insoluble in water. In this method, large amounts of the crosslinking compound are required to form the water-insoluble polyvinyl alcohol; in fact, it has been determined that to achieve the goal desired in Pat. 2,169,250, i.e., insolubilization of the polyvinyl alcohol, the amount of polycarboxylic acid utilized must be sufficient to provide the resulting polyvinyl alcohol with a pH below 3. As long as the pH of the polyvinyl alcohol is above 3, no insolubilization will occur. The thermal stability of polyvinyl alcohol also decreases at pH values below 3.

It is the principal object of this invention to provide polyvinyl alcohol having improved thermal stability. It is a further object of this invention to improve the thermal stability of polyvinyl alcohol containing an alkali metal acetate by a process which does not impair water solubility of the polyvinyl alcohol. It is a further object of the invention to improve the thermal stability of polyvinyl alcohol by a process which is simple and economical.

SUMMARY OF INVENTION

The method of the present invention comprises, in the preparation of polyvinyl alcohol by alcoholyzing a polyvinyl ester with an alkali metal alcoholate catalyst; neutralizing the resulting alkaline polyvinyl alcohol-containing mixture with acetic acid with the formation of an alkali metal acetate, a portion of which adheres to and is contained in the polyvinyl alcohol; and separating the neutralized polyvinyl alcohol containing adhering alkali metal acetate from the alcoholysis reaction medium, the improvement comprising mixing with the polyvinyl alcohol containing adhering alkali metal acetate a sufficient amount of a cyclic polycarboxylic acid selected from the group consisting of phthalic acid, terephthalic acid, isophthalic acid, and cis 4-cyclohexene dicarboxylic acid-1,2 to convert substantially all the alkali metal acetate contained in the polyvinyl alcohol to acetic acid and an alkali metal salt of the cyclic polycarboxylic acid such that when the polyvinyl alcohol is made up as a 10 percent solution in water, the solution has a pH from about 3.0 to about 3.5.

DETAILED DESCRIPTION OF THE INVENTION

As stated above, this invention comprises mixing a cyclic polycarboxylic acid selected from the group consisting of phthalic acid, terephthalic acid, isophthalic acid and cis 4-cyclohexene dicarboxylic acid 1,2- with neutralized polyvinyl alcohol containing adhering alkali metal acetate to improve the thermal stability of the polyvinyl alcohol.

The cyclic polycarboxylic acids are added to the polyvinyl alcohol containing adhering alkali metal acetate in an amount sufficient to convert the alkali metal acetate intimately associated with the polyvinyl alcohol to acetic acid and alkali metal salt of the cyclic polycarboxylic acid. The addition of the cyclic polycarboxylic acids should be in an amount sufficient to provide 10 percent aqueous solutions of the treated polyvinyl alcohol with a pH of from about 3.0 to about 3.5, with a ph of aboult 3.3±0.1 being preferred. The preferred cyclic polycarboxylic acid is cis 4-cyclohexene dicarboxylic acid 1,2.

The term "thermal stability," as used herein, refers to the substantially complete lack of color development in polyvinyl alcohol in either powder or film form when subjected to heat treatments involving temperatures above 100° C.

As stated above, it is theorized that color develops in polyvinyl alcohol prepared according to conventional procedures, such as that described in U.S. Pat. 2,734,048, when subjected to heat treatments involving temperatures above 100° C. due to the presence in the polyvinyl alcohol of certain alkali metal acetate salts. These salts are formed when the alkali metal alcoholate catalyzed alcoholysis reaction mixture, in which sodium methylate is the preferred catalyst, is neutralized with acetic acid. Sodium acetate is formed, for example, and is contained in the polyvinyl alcohol when acetic acid is mixed with the alkaline, sodium methylate catalyzed, polyvinyl alcohol reaction mixture to neutralize the alkaline alcoholysis reaction. For sake of convenience, reference herein to the alkali metal acetate salt associated with the acetic acid neutralized polyvinyl alcohol will be limited simply to sodium acetate, and such reference will be understood to include other alkali metal acetate salts.

It is, of course, desirable to remove the sodium acetate from the neutralized polyvinyl alcohol to prevent thermal discoloration. As noted above, one possible manner utilized to remove the undesired sodium acetate from the neutralized polyvinyl alcohol is to wash the material, with any suitable agent, such as methanol. However, repeated washings are required if sufficient amounts of sodium acetate are to be removed to make the polyvinyl alcohol thermally stable. Generally, polyvinyl alcohol containing a level of from about 0.5 percent to about 1 percent of sodium acetate, by weight, based on the weight of the total polyvinyl alcohol, can be obtained in commercially feasible washing operations. However, it has been found that a level of below 0.05 percent, by weight, of sodium acetate must be achieved to have a significant improvement in the thermal stability. Thus, the washing procedure does not solve the thermal stability problem.

According to this invention, the problem of thermal stability posed by the presence of sodium acetate in polyvinyl alcohol is eliminated by converting the sodium acetate to a more thermally stable salt through the addition of the cyclic polycarboxylic acids noted above to the sodium acetate containing polyvinyl alcohol. These acids, it is theorized, react with the sodium acetate intimately associated with the polyvinyl alcohol, forming a more thermally stable salt and acetic acid. For example, assuming the cyclic polycarboxylic acid to be phthalic acid, the reaction expected would be as follows:

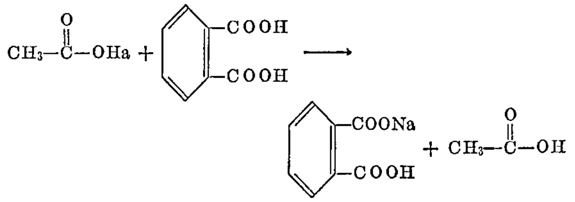

The phthalic acid is combined with the polyvinyl alcohol containing sodium acetate in excess of the amount required simply to convert the sodium acetate to acetic acid, the phthalic acid being converted to the monosodium salt of phthalic acid. This salt is thermally stable and the acetic acid poses no problem of thermal instability. In addition, the cyclic polycarboxylic acid and the salt formed in the reaction with the sodium acetate are compatible with the polyvinyl alcohol. Thus, films formed from treated polyvinyl alcohol will not bloom or haze due to migration of these compounds to the surface of the film. Moreover, the solubility of the polyvinyl alcohol in water is not affected by the treatment with the cyclic polycarboxylic acids.

The cyclic polycarboxylic acids may be combined with the neutralized polyvinyl alcohol in either solid or solution form; likewise the neutralized polyvinyl alcohol may be in either finely-divided form or in solution when combined with the cyclic polycarboxylic acids. It has been found, however, that the most appropriate point in the usual polyvinyl alcohol production process for the addition of the cyclic polycarboxylic acids is to the acetic acid-neutralized polyvinyl alcohol after it has been separated as a finely-divided solid from the alkaline alcoholysis reaction mixture in any convenient manner such as by filtration. The cyclic polycarboxylic acid can be dissolved in an alcohol solvent, preferably methanol, and added to the neutralized polyvinyl alcohol or, as is preferred, the acid can be added in a dry form to a wet filter cake of the neutralized polyvinyl alcohol which has been washed with an alcohol such as methanol. In this manner, the cyclic polycarboxylic acid is solubilized by the alcohol remaining in the filter cake and a minimum amount of cyclic polycarboxylic acid is required since some of the sodium acetate will have been removed by the washing. When dry blends of neutralized polyvinyl alcohol and cyclic polycarboxylic acid are combined, the blend is preferably dissolved in water for the polyvinyl alcohol treatment.

No special temperature or time requirements are necessary for the cyclic polycarboxylic acid treatment.

After addition of the cyclic polycarboxylic acid to the wet polyvinyl alcohol filter cake, the filter cake is dried, producing thermally stable polyvinyl alcohol. If desired, although not required, the filter cake can be washed with alcohol after the cyclic polycarboxylic acid treatment, prior to drying.

Drying of the cyclic polycarboxylic acid treated polyvinyl alcohol is accomplished by heating the polyvinyl alcohol to a temperature of from about 60° C. to about 100° C. at atmospheric pressure or at a temperature of from about 25° to about 50° C. under reduced pressure.

Treatment of the neutralized polyvinyl alcohol with a cyclic polycarboxylic acid to convert the undesired sodium acetate to acetic acid and an alkali metal salt of the cyclic polycarboxylic acid, has no adverse effects on the other desirable qualities of polyvinyl alcohol; that is, the film forming properties, rate of solution, and the temperature required for solution in water, for example, of the polyvinyl alcohol or the resultant heat treated or air dried films of the polyvinyl alcohol are not adversely affected by the treatment with the cyclic polycarboxylic acids.

The polyvinyl alcohol treated with a cyclic polycarboxylic acid in accordance with this invention is prepared by known methods, as stated above, one method being that described in U.S. Pat. 2,734,048, the contents of which are incorporated herein by reference. The polyvinyl ester utilized in this invention may be derived from a carboxylic acid containing from one to four carbon atoms such as formic, acetic, propionic or butyric acid. The polyvinyl ester, e.g., polyvinyl acetate, is alcoholyzed with monohydroxy saturated aliphatic alcohol containing from one to four carbon atoms, such as methanol, ethanol, propanol and butanol, preferably methanol.

The alcoholysis of the polyvinyl ester is aided by the presence of an anhydrous alkali metal alcoholate catalyst, preferably sodium methylate, although other alkali metal alcoholates, e.g., potassium ethylate, lithium butylate, sodium propylate, sodium butylate, sodium decylate, and the like may be used as the catalyst. The catalyst is utilized in a concentration of from about 0.1 percent to about 5 percent, preferably from about 0.2 percent to about 0.5 percent, by weight, based on the weight of the reaction mixture.

The alcoholysis reaction is preferably carried out in an apparatus consisting of multiple reaction vessels connected in series such that the effluent from the first reaction vessel flows into the second reaction vessel and the effluent from the latter is treated to recover the polyvinyl alcohol therefrom. Such an apparatus is defined with more specificity in U.S. Pat. 2,734,048.

An alternate continuous process for the production of polyvinyl alcohol that gives thermally stable haze free films comprises continuous filtration of the alkaline polyvinyl acetate hydrolysate (before neutralization), washing the cake on the filter continuously with ½ to 1½ pounds methanol per pound of product, then washing on the continuous filter with about 1 pound 85/15/5 methyl acetate/methanol/water per pound of product, said final wash containing about 0.1–4 percent polycarboxylic acid, preferably 0.5–1 percent fumaric acid or the like, for neutralization to give a heat stable low ash product.

The following examples are included to illustrate the above described invention in detail.

EXAMPLE I

A 2000 ml. glass vessel equipped with a paddle agitator, refluxing condenser and a dropping funnel is placed in a water bath maintained at 60° C. 400 g. of a 2 percent by weight solution of sodium methylate in methanol is added to the vessel. 500 g. of polyvinyl acetate (having a viscosity at 20° C. of 65 centipoises when dissolved in benzene in a concentration of 86 g./l.) in the form of a 45 percent by weight solution in methanol is added to the vessel with constant agitation at 300 r.p.m. through the dropping funnel over a 60 minute interval at a uniform rate. The reaction is continued for an additional 30 minutes after completion of the polyvinyl acetate addition after which time the contents of the 2000 ml. vessel are neutralized by the addition of 8 g. of glacial acetic acid. The neutralized charge is diluted with 800 g. of methanol, cooled to 30° C. and filtered. An aliquot of the filter cake is dried for 16 hours in a vacuum oven at 60° C. The dry polyvinyl alcohol has a saponification number of 4.0 and a 4 percent aqueous solution has a viscosity at 20° C. of 60 centipoises. The analysis for sodium acetate gives 1.5 percent by weight. The remainder of the filter cake is used for thermal stability tests which are summarized in Table 1.

TABLE 1.—AIR DRIED 1.5 MIL THICK FILMS OF POLYVINYL ALCOHOL MADE FROM 10% AQUEOUS SOLUTIONS OF POLYVINYL ALCOHOL WITH pH INDICATED [1]

| Additive [2] | pH [3] | Stability (min.) [4] |
|---|---|---|
| Blank | 6.5 | 10 |
| Isophthalic acid | 5.0 | 30 |
| | 4.5 | 70 |
| | 4.0 | 80 |
| | 3.5 | 100 |
| | 3.3 | 150 |
| | 3.0 | 120 |
| | 2.5 | 80 |
| Cis 4-CHDA-1,2 [5] | 6.0 | 15 |
| | 5.0 | 60 |
| | 4.5 | 120 |
| | 4.0 | 180 |
| | 3.5 | 200 |
| | 3.3 | 250 |
| | 3.0 | 200 |
| | 2.5 | 100 |

[1] Additive was mixed (approximately 5 minutes) with the wet, methanol-washed filter cake until completely dissolved in liquid phase present in the wet filter cake cake (methanol/methyl acetate mixture of approximately 94/6). The cake was then vacuum dried for 16 hours at 60° C.

[2] 0.8 to 2.0% additive used to obtain stated pH.

[3] 10% solution of polyvinyl alcohol in water.

[4] Minutes required in air circulating oven at 160° C. for first onset of yellow color.

[5] Cis 4-cyclohexene dicarboxylic acid-1,2.

EXAMPLE II

Polyvinyl alcohol (having a saponification number of 6.0, and a viscosity of 60 centipoises in the form of a 4 percent solution in water at 20° C.) made by the alcoholysis of a polyvinyl acetate-methanol solution using sodium methylate as a catalyst and neutralized with glacial acetic acid containing 1.5 percent by weight of sodium acetate, is dissolved in water as a 10 percent solution and then divided into equal aliquots to which various acids are added. Films of this material are then cast on clear polymethyl methacrylate plates to produce air-dried films of 1.5 mil thickness. These films are then heated in an air-circulation oven at 160° C. with the results as summarized in Table 2. The salt free and acid treated films can be dissolved in water whereas the untreated film is only partially soluble in water.

TABLE 2.—AIR DRIED 1.5 MIL THICK FILMS OF POLYVINYL ALCOHOL MADE FROM 10% AQUEOUS SOLUTION OF POLYVINYL ALCOHOL CONTAINING INDICATED ADDITIVES

| Additive compound | Percent based on polyvinyl alcohol | Stability (min.) [1] |
|---|---|---|
| None | 0.0 | 10 |
| Phthalic acid | 1.0 | 80 |
| Terephthalic acid | 1.0 | 80 |
| Isophthalic acid | 1.0 | 100 |
| CHDA 1,2 [2] | 1.0 | 180 |
| Salt free [3] | | 400 |

[1] Minutes required in air circulating oven at 160° C. for first onset of yellow color.

[2] Cis 4-cyclohexene dicarboxylic acid-1,2.

[3] Soxhlet extracted with methanol to give a sodium acetate content of 100 p.p.m.

EXAMPLE III 100 g. of a commercial grade of polyvinyl alcohol containing the following amounts of salts (1.5 percent sodium acetate+0.15 percent $Na_2SO_4$+0.2 percent $Na_2S_2O_6$) was mixed with 1 g. of the cyclic polycarboxylic acids listed in Table 3 and dissolved in water as 10 percent solutions. The solutions are cast on polymethyl methacrylate plates in the form of 15 mil wet films which are dried to approximately 1.5 mil films and exposed to temperatures of 160° C. for 10 minutes after which the films are arranged in order of decreasing color and rated visually as to apparent color. The numerical values in Table 3 represent the number of 1.5 mil layers necessary to make them of all the same color, with 40 to 60 layers of the film prepared from the sodium acetate free polyvinyl alcohol required to equal the color obtained with film prepared from polyvinyl alcohol having no polycarboxylic acid treatment at all.

TABLE 3

Improvement in heat stability; elimination of discoloration when heated in air at 160° C.

| Additive: | Stability rating |
|---|---|
| None | 1.0 |
| Terephthalic acid [1] | 3.0 |
| Phthalic acid | 5.0 |
| Itaconic acid | 5.0 |
| Isophthalic acid | 7.5 |
| Tartaric acid | 10.0 |
| Citric acid | 10.0 |
| Cis CHDA 1,2 [2] | 12.0 |
| Salt free (soxhlet extracted) | 40–60 |

[1] Impure sample with yellow color.
[2] Cis 4-cyclohexene dicarboxylic acid-1,2.

I claim:

1. In the preparation of polyvinyl alcohol which comprises alcoholyzing a polyvinyl ester with an alkali metal alcoholate catalyst; neutralizing the resulting alkaline polyvinyl alcohol-containing reaction mixture with acetic acid with the formation of an alkali metal acetate, a portion of which adheres to and is contained in the polyvinyl alcohol; and separating the neutralized polyvinyl alcohol containing adhering alkali metal acetate from the alcoholysis reaction mixture, the improvement comprising mixing with the polyvinyl alcohol containing adhering alkali metal acetate a sufficient amount of cyclic polycarboxylic acid selected from the group consisting of phthalic acid, terephthalic acid, isophthalic acid, and cis 4-cyclohexene dicarboxylic acid-1,2 to convert substantially all the alkali metal acetate contained in the solid polyvinyl alcohol to acetic acid and an alkali metal salt of the cyclic polycarboxylic acid, such that when the polyvinyl alcohol is made up as a 10% solution in water, the solution has a pH of from about 3.0 to about 3.5.

2. The method of claim 1 wherein the polyvinyl alcohol is separated from the alcoholysis reaction mixture by filtration, and the cyclic polycarboxylic acid is mixed with the polyvinyl alcohol filter cake.

3. The method of claim 2 wherein the polyvinyl alcohol filter cake is washed with methanol prior to the addition of the cyclic polycarboxylic acid.

4. The method of claim 1 wherein the alkali metal alcoholate catalyst is sodium methylate and the alkali metal acetate contained in the polyvinyl alcohol is sodium acetate.

5. The method of claim 1 wherein the cyclic polycarboxylic acid is added in an amount sufficient such that when the polyvinyl alcohol is made up as a 10% solution in water, the solution has a pH of about 3.3±0.1.

6. The method of claim 5 wherein the cyclic polycarboxylic acid is cis 4-cyclohexene dicarboxylic acid-1,2.

References Cited

UNITED STATES PATENTS

| | | | |
|---|---|---|---|
| 2,169,250 | 8/1939 | Izard | 18—54 |
| 2,734,048 | 2/1956 | Bristol et al. | 260—91.3 |
| 2,785,146 | 3/1957 | Davies et al. | 260—45.75 |
| 3,156,667 | 11/1964 | Martins | 260—45.7 |
| 3,220,991 | 11/1965 | Martins | 260—91.3 |

JOSEPH L. SCHOFER, Primary Examiner

S. M. LEVIN, Assistant Examiner

U.S. Cl. X.R.

260—89.1, 91.3 VA